United States Patent [19]

McChesney et al.

[11] 3,984,498
[45] Oct. 5, 1976

[54] BLOWN THERMOPLASTIC BOTTLE AND METHOD FOR MAKING SAME

[75] Inventors: Charles Edmund McChesney, South Brunswick, N.J.; Robert J. McHenry, St. Charles, Ill.; James Alan Wachtel, South Brunswick, N.J.

[73] Assignee: American Can Company, Greenwich, Conn.

[22] Filed: Oct. 18, 1974

[21] Appl. No.: 516,110

Related U.S. Application Data

[63] Continuation-in-part of Ser. No. 248,495, April 28, 1972, abandoned.

[52] U.S. Cl.  ................... 260/879; 264/97; 264/98; 220/DIG. 14; 526/328
[51] Int. Cl.² ................ C08F 15/22; C08F 19/06; C08F 19/08
[58] Field of Search ............... 204/98, 97; 260/879, 260/82.3

[56] References Cited
UNITED STATES PATENTS

| | | |
|---|---|---|
| 3,426,102 | 2/1969 | Solak et al. ........................ 260/879 |
| 3,451,538 | 6/1969 | Trementozzi ................... 260/879 X |
| 3,733,309 | 5/1973 | Wyeth et al. ...................... 264/98 X |
| 3,733,797 | 6/1973 | Hafner et al. ..................... 264/98 X |
| 3,755,277 | 8/1973 | Toups .............................. 264/98 X |

OTHER PUBLICATIONS

Thermoforming with Barex 210, SPE Journal, vol. 28, pp. 35–38, Blower et al.
Transparent Barrier Resins with High Nitrile Content, Hughes et al., J.P.S., vol. 13, pp. 2567–2577, (1969).

*Primary Examiner*—William F. Hamrock
*Attorney, Agent, or Firm*—Robert C. Auber; Ira S. Dorman; James W. Bock

[57] ABSTRACT

A thermoplastic bottle has a unique combination of properties. The bottle is characterized by a very high level of molecular orientation, and possesses the properties of high impact strength, low gas permeability and excellent resistance to creep strain under tensile load. A blowing process for fabricating the bottle is also taught which features a means of substantially improving the resistance to creep strain.

50 Claims, 6 Drawing Figures

BLOWN THERMOPLASTIC BOTTLE AND METHOD FOR MAKING SAME

BACKGROUND OF THE INVENTION

This invention relates to thermoplastic bottles and more particularly to thermoplastic beer and carbonated beverage bottles having a unique combination of physical properties and is a continuation-in-part of Ser. No. 248,495 filed Apr. 28, 1972, now abandoned.

There are polymeric materials available today which have high impact strength and low gas permeability but none of these possesses the property of excellent resistance to creep strain under tensile load, which is so necessary to the manufacture of commercially acceptable plastic bottles for beer and carbonated beverage. Creep strain is undesirable for two reasons: it results in a change of bottle shape whereby the liquid level is lowered, and it results in a loss of carbonation of the liquid owing to the expanded volume of the bottle.

The instant invention therefore provides a thermoplastic bottle having the following unique combination of physical properties: high impact strength, excellent resistance to creep strain under tensile road, and extremely low gas permeability. Existing thermoplastic bottles possess one or two of these properties, but the combination of all three in the required degree is unknown in the prior art.

This unique combination of physical properties is desired for the packaging of fluids under a high internal pressure, i.e. beer, carbonated beverages, and aerosol container products. A high level of molecular orientation, as characterized by orientation release stree (ASTM D 1504), is utilized to obtain the physical properties specified above.

It is known that the physical properties of thermoplastic polymers can be improved by uncoiling and straightening the molecules of the polymeric material by a stretching operation while the polymeric material is at a temperature at which such molecular orientation can be imparted thereto (orientation temperature), i.e, while the polymeric material is in the so-called "leathery" state, and thereafter cooling the material so that the molecules of the polymer are set in the direction or directions in which the stretch is applied.

SUMMARY OF THE INVENTION

It has not been known until the present invention that very high levels of orientation can result in surprisingly dramatic improvements in the creep strain resistance of thermoplastic, polymeric materials. Accordingly, the instant invention provides a method of substantially improving resistance to creep strain in thermoplastic polymers which comprises molecularly orienting the polymer to an orientation release stress between 350 and 2500 p.s.i.

The instant invention also provides a bottle weighing 0.03 to 0.13 grams per cubic centimeter of internal volume blown from a thermoplastic polymer having an oxygen permeability between 0.3 and 6.0 $cm^3$. mil/100 $in^2$.day.atm carbon dioxide permeability between 0.5 and 10.0 $cm^3$.mil/100 $in^2$.day.atm. The test is conducted at 73°F. and 0 per cent relative humidity. The bottle has a sidewall creep strain in the circumferential direction of 0 to 3.0 per cent under a wall stress in the circumferential direction of 3000 p.s.i. at 100 hours at 98° F. at 50 per cent relative humidity, said bottle, when enclosed and filled with water carbonated with 3.7 volumes of carbon dioxide per 1 volume of water, able to withstand a free fall of at least 3 feet when dropped on its bottom onto a steel surface.

DESCRIPTION OF THE PREFERRED EMBODIMENT

The instant invention is best practiced according to the parameters set forth hereinbelow. In forming a parison 11 (FIG. 1) from which a bottle 13 having a sidewall 15 (FIG. 2) is blown, it is necessary to select a thermoplastic polymer having low permeability to gases, so that the bottle 13 may act as a barrier to gases. The barrier properties of a polymer are determined in large part by the characteristics of the monomers from which said polymers are made. Monomers having high dipole moments are particularly suited for making barrier resins because their high dipole moments result in strong intermolecular forces between the polymer chains, reducing the diffusion and permeation rates of gases through the polymer. Since permeability is reduced as the concentration of highly polar monomer is increased, at least 50% by weight of the final polymer should result from inclusion of highly polar monomers in the polymerization reaction.

The polymers suited for use in the instant invention should have an oxygen permeability between 0.5 and 3.0 $cm.^3$ per 100 square inches per mil thickness and a carbon dioxide permeability between 0.8 and 5.0 $cm.^3$ per 100 square inches per mil thickness when tested for 24 hours at a differential pressure of 1 atmosphere at 73° F. and 0 per cent relative humidity. Preferably, the oxygen permeability is less than 0.8 $cm^3$.mil/100 $in^2$.day.atm and the carbon dioxide permeability is less than 2.0 $cm^3$. mil/100 $in^2$.day.atm.

The polymers most suited for the present invention are prepared by polymerizing a major portion of an olefinically unsaturated nitrile, such as acrylonitrile, and a minor portion of an ester of an olefinically unsaturated carboxylic acid, such as ethyl acrylate, methyacrylate or an aromatic olefin such as styrene, in the presence of an unsaturated rubber. Such a rubber might comprise a major proportion of a conjugated diene monomer, such as butadiene, and a minor proportion of olefinically unsaturated nitrile, such as acrylonitrile or an aromatic olefin such as styrene.

The conjugated diene monomers useful in the present invention include 1,3-butadiene, isoprene, and others such as chloroprene, 2,3-dimethyl-1,3-butadiene, 2-ethyl-1,3-butadiene, 2,3-diethyl-1,3-butadiene.

The olefinically unsaturated nitriles useful in the present invention are the alpha,beta-olefinically unsaturated mononitriles having the structure wherein R is hydrogen, a lower alkyl group having from 1 to 4 carbon atoms, or a halogen. Such compounds include acrylonitrile, methacrylonitrile, alphachloroacrylonitrile, alpha-fluoroacrylonitrile, ethacrylonitrile and others.

The esters of olefinically unsaturated carboxylic acids useful in the present invention are preferably the lower alky esters of alpha,beta-olefinically unsaturated carboxylic acids and more preferred are the esters having the structure wherein $R_1$ is hydrogen, an alkyl group having from 1 to 4 carbon atoms, or a halogen and $R_2$ is an alkyl group having from 1 to 6 carbon atoms. Compounds of this type include methyl acrylate, ethyl acrylate, other acrylates and methacralates, and the like.

The aromatic olefins useful in the present invention include styrene, alpha-methyl styrene, vinyl toluene, and others containing 8–14 carbon atoms.

Preferred polymers for the present invention are derived from (A) about 60 to 90 parts by weight of an alpha,beta-olefinically unsaturated mononitrile having the structure $CH_2=C(-R_1)-CN$ where $-R_1$ is selected from the group consisting of hydrogen, halogen, and the lower alkyl groups, (B) about 40 to 10 parts by weight of an ester of an olefinically unsaturated carboxylic acid having the structure $CH_2=C(-R_1)-C(O)O-R_2$ where $-R_1$ is as defined above and $-R_2$ is an alkyl group having from 1 to 6 carbon atoms, (A) and (B) together comprising 100 parts by weight, polymerized in the presence of (C) about 1 to 20 parts by weight of a nitrile rubber containing about 60 to 80 per cent by weight of moieties derived from a conjugated diene monomer and about 40 to 20 per cent by weight of moieties derived from a mononitrile having said $CH_2=C(-R_1)-CN$ structure.

The more preferred polymers for the present invention are derived from about 60 to 90 parts by weight of acrylonitrile or methacrylonitrile and about 40 to 10 parts by weight of an ester selected from the group consisting of methyl acrylate, ethyl acrylate and methyl methacrylate, polymerized in the presence of about 1 to 20 additional parts by weight of a nitrile rubber containing about 60 to 80 per cent by weight butadiene or isoprene moieties and about 40 to 20 per cent by weight of acrylonitrile or methacrylonitrile moieties.

More specifically, the preferred polymers are derived from about 73 to 77 parts by weight acrylonitrile and 27 to 23 parts by weight methyl acrylate, polymerized in the presence of 8 to 10 additional parts by weight of a nitrile rubber containing about 70 per cent by weight butadiene moieties and about 30 per cent by weight acrylonitrile moieties.

Examples of the polymers suited for use in the instant invention may be found in U.S. Pat. No. 3,426,102, the entirety of which is hereby incorporated into the instant specification by reference.

Examples of other preferred polymers suited for use in the present invention may be found in U.S. Pat. No. 3,819,762, the entirety of which is incorporated into the instant specification by reference. Therein is disclosed as an example a composition consisting essentially of a copolymer of acrylonitrile and styrene blended with polymer comprising a rubber component polymerized from styrene and butadiene or isoprene onto which a copolymer of styrene and acrylonitrile is grafted. Typically, the composition would be about 70% by weight acrylonitrile, about 20% by weight styrene and about 10% by weight butadiene.

Forming the parison may be achieved by any one of several techniques. In one method, a hollow cylinder is extruded from an annular die. The bottom end of the parison is formed by closing one end of the cylinder by pinching, swaging, compression molding, or some other mechanical means either immediately after extrusion when the cylinder is still hot, or after the cylinder (or at least one end thereof) has been reheated. The other end of the cylinder is left open for subsequent blowing. The desired neck finish can be formed either by a mechanical forming of the open end of the cylinder (such as compression molding) or by blowing into a neck mold of the proper dimensions. The forming of the neck finish can be accomplished either immediately after extrusion when the cylinder is still hot or after the cylinder (or at lest this end thereof) is reheated.

The continuous extruded cylinder can be cut to the proper length by a separate cutting operation or by mechanical means such as the pinching used to close the cylinder end, or by a combination of these methods. (See U.S. Pat. No. 3,599,280).

Extrusion blow molding is another parison forming technique that may be employed. In this method, the starting parison for the orientation blowing step is formed by blowing a hollow cylinder, extruded as described above, at a high temperature.

Figure 1:
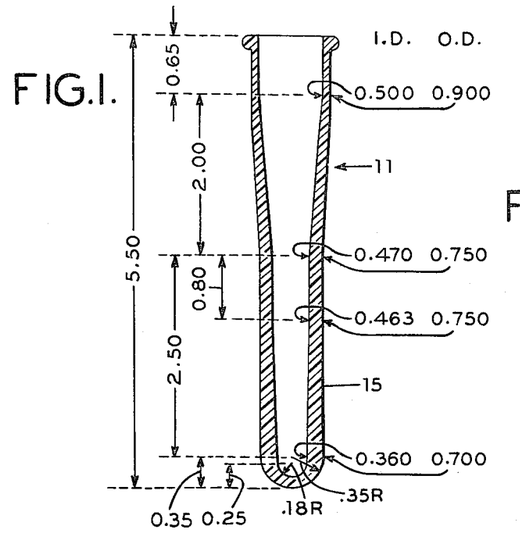
FIG. 1 is a central vertical sectional view of a parison used to form the bottle of the instant invention.

If it is found desirable in forming bottles of the desired material and orientation distribution to start with a parison of non-uniform thickness and/or diameter, as seen in FIG. 1, injection molding the parison is recommended, as well as any of several "programmed parison" methods when the parison is extruded, such as variable extrusion rates, a movable core mandrel, mechanical stretching of the cylinder as it is extruded, or mechanical stretching of a cylinder of non-uniform axial temperature distribution. Mechanical means such as compression molding, swaging or machining also enable one to begin bottle blowing with a non-uniformly thick parisons.

The next step in providing a plastic bottle according to the present invention comprises blow molding the parison in the leathery state into the desired bottle shape using high pressure fluid, at which time the polymer is oriented. Generally, the bottle is blown to a sidewall thickness between 5 and 50 mils at the maximum diameter, and preferably between 15 and 35 mils. Since resistance to creep is proportional to the amount of molecular orientation, it is desirable that the molecular orientation level be as high as possible, as determined by orientation release stress. The level of orientation achieved is dependent upon variations in conditions under which the bottle is oriented. Higher levels of orientation result from greater stretching rates, greater amounts of stretch, and/or lower stretching temperatures. It is thus desirable to blow slightly above the glass transition temperature. Once the bottle is blown, the orientation is locked in by cooling the bottle below the glass transition temperature. For the present invention, an average orientation release stress in the circumferential direction between 350 and 2500 p.s.i. as measured for total sidewall thickness may be imparted to the polymer comprising the bottle. Preferably the orientation release stress will fall between 500 and 1600 p.s.i., since within this range it is easy to avoid stress whitening of the polymer which so often accompanies higher levels of orientation, thus enabling the formation of a transparent bottle having high molecular orientation. Most preferably, the orientation release stress will fall between 800 and 1000 p.s.i.

For purposes of this specification, creep strain is defined to be the net total strain of the bottle when subjected to internal pressure creating a wall stress in the circumferential direction. For molecularly oriented bottles this strain is the resultant of a tendency for the bottle to expand under the effect of the internal pressure and an opposing tendency for the bottle to contract as a result of the locked-in orientation stresses. It can be shown that the net effect of these two tendencies could be substantially 0 per cent creep strain which might even be a small, negative, resultant amount of creep strain (contraction).

Unoriented bottles subjected to tensile forces (such as those resulting from internal pressure) respond with a rapid elastic extension followed by a viscous extension which takes place over a long period of time. The behavior of oriented bottles is more complex. They too exhibit elastic and viscous extensions in response to tensile forces; however, these extensions are opposed by the tendency to contract which is inherent in all molecularly oriented plastics. It is well known that oriented plastics shrink when heated above their glass transition temperature. Shrinkage also occurs below the glass transition temperature but at a greatly reduced rate. This shrinkage results from the molecules attempting to return to the random coil configuration from the extended network structure produced during the orientation process. The net amount of creep strain is therefore due to a balance which exists between these tensile and retractive tendencies. Where the retractive tendency is very strong and the tensile forces are moderate, there is the very real possibility of achieveing 0 per cent strain or of having a net contraction (a negative extension).

Bottles made according to the instant invention exhibit sidewall creep strains in the circumferential direction between 0 and 2.0 per cent when tested at a wall stress of 3000 p.s.i. in the circumferential direction after 100 hours at 98° F. at 50 per cent relative humidity. The wall stress, in test conditions, is generated by pressurized water. More specifically, under the same conditions, the bottles made according to the instant invention exhibit creep strains between 1.0 and 2.0 per cent. When tested at 4000 p.s.i., bottles of the present invention exhibit sidewall creep strains between 0.25 and 3.0 per cent.

Bottles of the present invention, i.e. weighing between 0.03 and 0.13 grams per cubic centimeter of internal volume, exhibit superior impact strength. They are able to withstand a free fall onto a steel surface when dropped on their bottoms of preferably at least about 6 and even as high as about 25 feet when enclosed and filled with water carbonated with 3.7 volumes of carbon dioxide per 1 volume of water. More specifically, they are able to withstand free falls between about 9 and 11 feet particularly when the bottles weigh between 0.06 and 0.1 grams per cubic centimeter of internal volume. Naturally, heavier bottles having thicker walls can be dropped from great heights without breaking. For purposes of this specification and the claims that follow, the drop heights indicated would be those as determined by ASTM D-2463. The data set forth in Table I, although not tested as per ASTM D-2463, clearly supports the range set forth above.

Another method of determining impact properties, independent of bottle geometry, consists of measuring the amount of energy absorbed in a flexural test conducted at high rates of loading. Test specimens are pieces of plastic cut from the walls of the bottle, and the results are reported in inch-lbs/square inch. This test is similar in many respects to the well known Charpy Impact Test ASTM-D 256-56 (1961), Method B, Unnotched, the primary difference being a smaller test specimen. Test conditions are as follows:

| SPECIMEN DIMENSIONS: | |
|---|---|
| Width | 0.125 inch |
| Thickness | 0.015–.035 inch |
| Length | 0.5 inch |
| Distance between end supports | 0.160, 0.240 inch |
| Test speeds (in./sec.) | 2.5, 110, 260 |

Specimens tested according to the above conditions demonstrate flexural impact values in excess of 3000 inch-lbs./square inch in the circumferential direction.

At the facilities of American Can Company's Laboratory in Princeton, NJ, unoriented compression molded plaques and molecularly oriented bottles were fabricated from various polymeric materials, described below, and measurements were made of the percent haze in the plaques and in the material of the sidewall of the bottles at different levels of molecular orientation. The degree of orientation of the polymeric material was determined by measurement of the orientation release stress (ORS) in accordance with ASTM D1504 on ⅛ inch × 1 inch samples taken from the sidewall of the bottles formed from that material. The percent haze was measured in accordance with ASTM D1003 and was observed with a Gardner Haze Meter Model UX-10 with a PG5500 digital readout.

Figure 5:
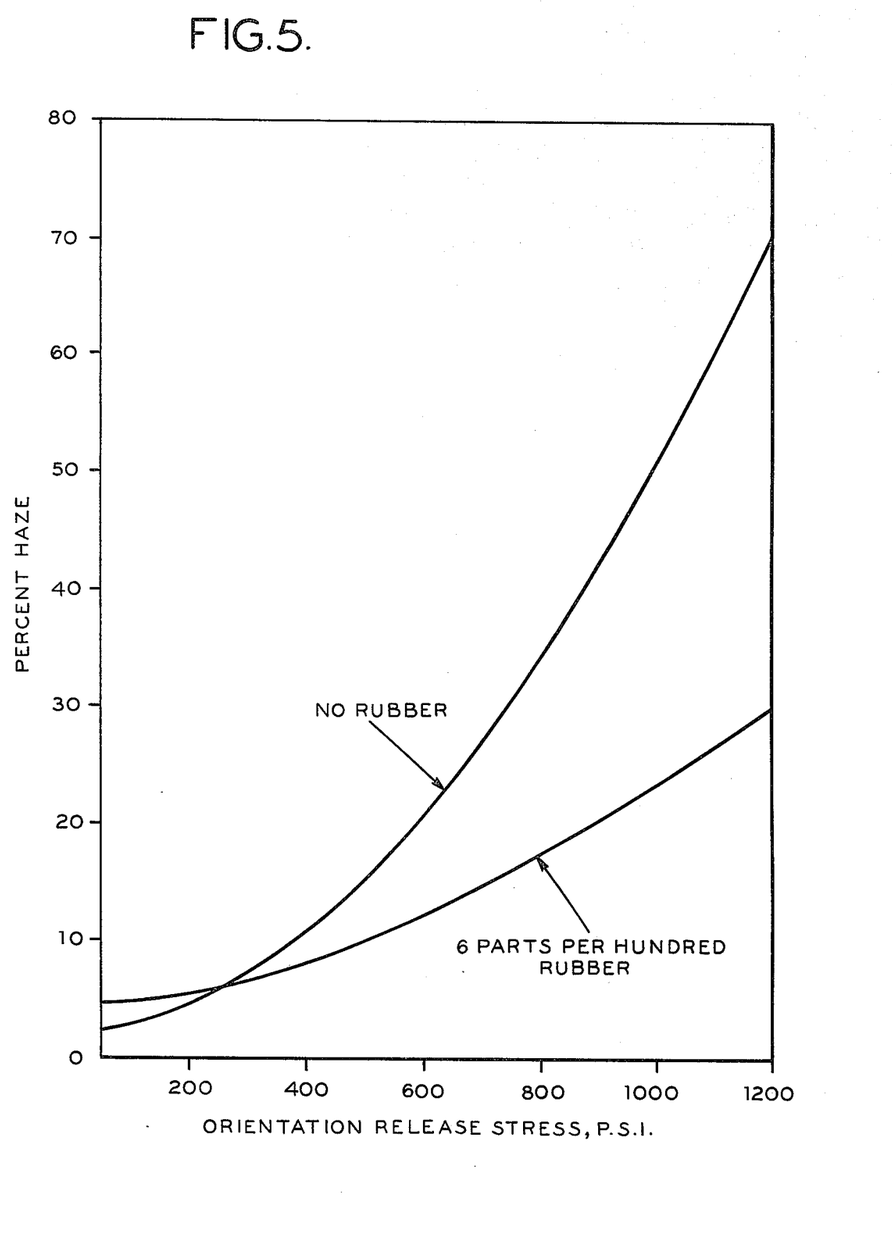
FIG. 5 and 6 are graphs showing the relationship between ORS and % haze as a function of rubber content.

Polymeric material No. 1 was a polymer containing about 74 weight percent acrylonitrile, about 23 weight percent styrene and no rubber component. Polymeric material No. 2 was a polymer containing about 74 weight percent acrylonitrile, about 23 weight percent styrene and about 6 additional parts per hundred of resin (phr) of a rubbery polymer containing about 49 weight percent butadiene. The ORS and percent haze values for samples taken from bottles and plaques fabricated from these materials are given in Table II and plotted in FIG. 5.

TABLE II

| Polymeric Material No. 1 | | Polymeric Material No. 2 | |
|---|---|---|---|
| ORS | % Haze | ORS | % Haze |
| 0 | 3 | 0 | 4 |
| 0 | 4 | 0 | 6 |
| 360 | 7 | 380 | 6 |
| 360 | 8 | 410 | 8 |
| 370 | 6 | 470 | 8 |
| 380 | 8 | 490 | 9 |
| 540 | 22 | 720 | 15 |
| 580 | 25 | 760 | 18 |
| 760 | 31 | 780 | 18 |
| 870 | 38 | 860 | 18 |

TABLE II-continued

| Polymeric Material No. 1 | | Polymeric Material No. 2 | |
|---|---|---|---|
| ORS | % Haze | ORS | % Haze |
| 1090 | 57 | 1020 | 26 |
| 1150 | 64 | 1280 | 32 |
| 1200 | 69 | 1380 | 33 |
|  |  | 1520 | 30 |

Figure 6:
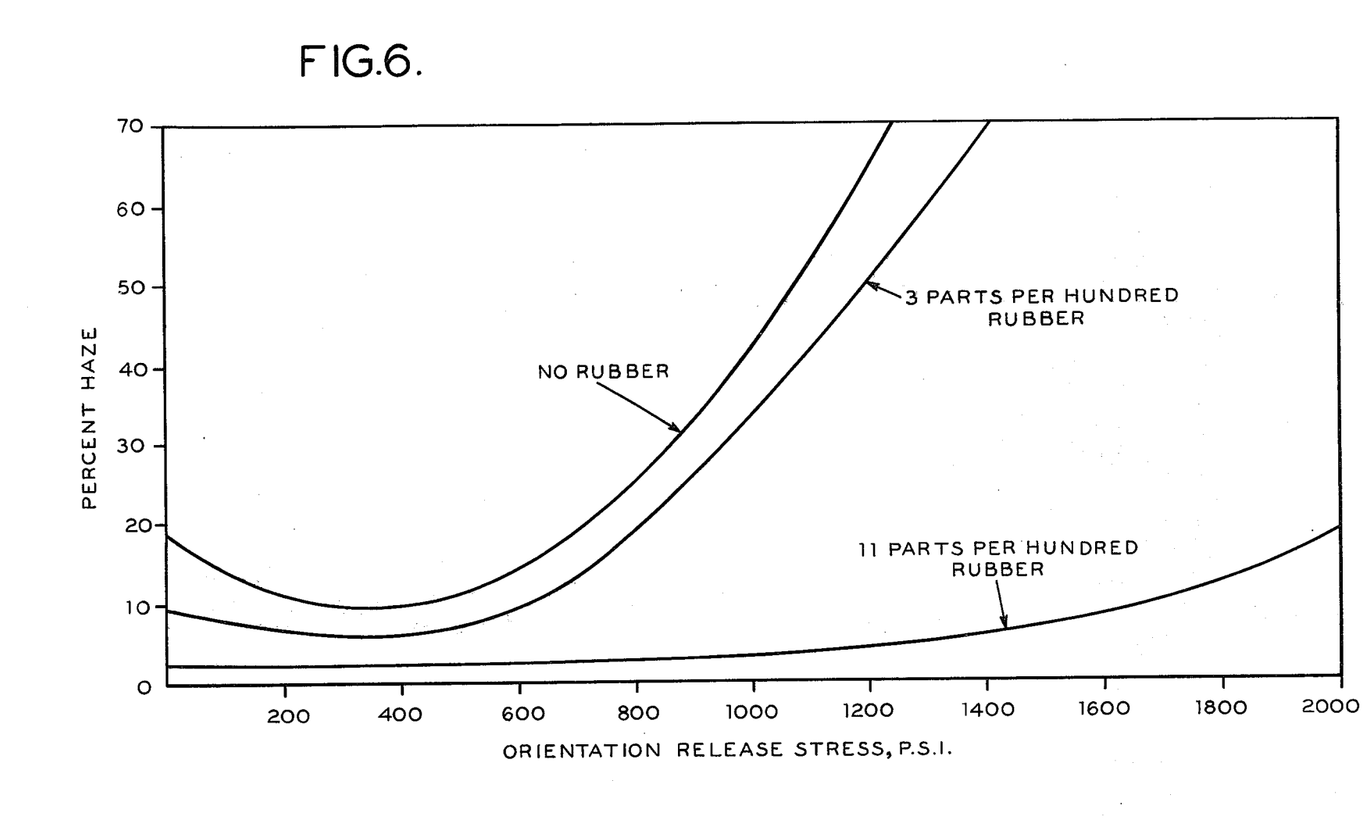

Polymeric material No. 3 was a polymer containing about 80 weight percent acrylonitrile, about 20 weight percent styrene and no rubbery component. Polymeric material No. 4 was the same as No. 3, but, in addition, contained about 3 phr of a rubbery polymer of butadiene and styrene. Polymeric material No. 5 was the same as No. 3, but, in addition, contained about 11 phr of a rubbery polymer of butadiene and styrene. The ORS and percent haze values for samples taken from bottles and plaques fabricated from these materials are given in Table III and plotted in FIG. 6.

TABLE III

| Polymeric Material No. 3 | | Polymeric Material No. 4 | | Polymeric Material No. 5 | |
|---|---|---|---|---|---|
| ORS | % Haze | ORS | % Haze | ORS | % Haze |
| 0 | 19 | 0 | 6 | 0 | 2 |
| 0 | 19 | 0 | 7 | 0 | 2 |
| 480 | 9 | 290 | 11 | 290 | 2 |
| 650 | 6 | 320 | 20 | 290 | 4 |
| 720 | 8 | 340 | 23 | 390 | 3 |
| 720 | 10 | 390 | 18 | 720 | 4 |
| 740 | 21 | 400 | 2 | 770 | 3 |
| 780 | 5 | 450 | 7 | 820 | 4 |
| 800 | 24 | 470 | 8 | 870 | 5 |
| 810 | 17 | 480 | 7 | 910 | 2 |
| 820 | 23 | 480 | 9 | 960 | 3 |
| 830 | 17 | 510 | 3 | 960 | 4 |
| 850 | 35 | 560 | 3 | 960 | 6 |
| 870 | 9 | 520 | 7 | 990 | 5 |
| 980 | 47 | 700 | 6 | 1040 | 6 |
| 1310 | 71 | 720 | 15 | 1150 | 3 |
|  |  | 720 | 15 | 1200 | 26 |
|  |  | 790 | 21 | 1460 | 8 |
|  |  | 810 | 31 | 1530 | 4 |
|  |  | 830 | 22 | 2020 | 16 |
|  |  | 860 | 30 |  |  |
|  |  | 870 | 27 |  |  |
|  |  | 1080 | 46 |  |  |
|  |  | 1160 | 43 |  |  |
|  |  | 1200 | 61 |  |  |
|  |  | 1280 | 47 |  |  |
|  |  | 1280 | 57 |  |  |

Figure 2:
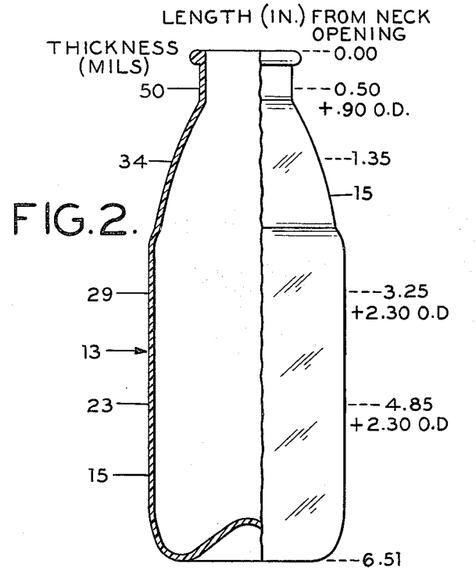
FIG. 2 is a central vertical sectional view of a bottle blow molded from the parison of FIG. 1.

In the examples that follow, the blown bottles all have the shape shown in FIG. 2, and the polymer used was derived from 75 parts by weight acrylonitrile and 25 parts by weight methyl acrylate polymerized in the presence of 9 additional parts by weight of a nitrile rubber containing about 70 per cent by weight 1,3-butadiene and about 30 per cent by weight acrylonitrile. This polymer has a glass transition temperature of about 180°F. All bottles discussed in the examples below were blown to produce a transparent bottle.

Figure 3:
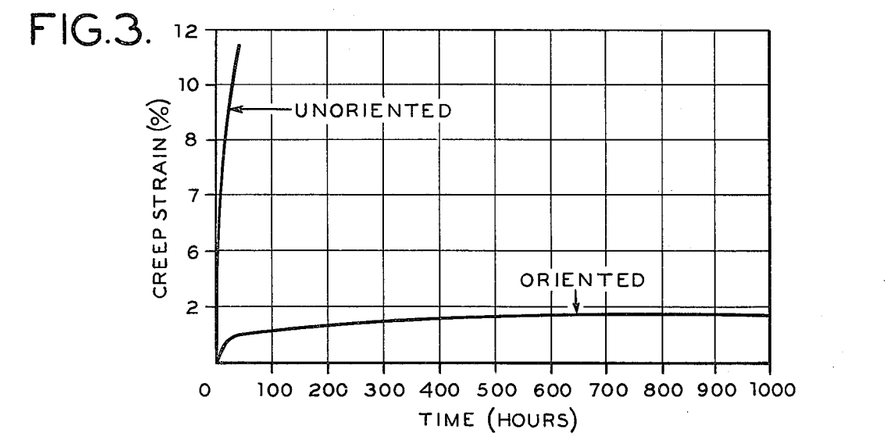
FIG. 3 is a graph of the creep strain in the sidewall of an oriented and unoriented bottle at 98°F. and 50 per cent relative humidity.

The difference in creep behavior between unoriented and oriented bottles is shown in FIG. 3. The unoriented bottle was made by extrusion blow molding. It has an internal volume of 12.4 fluid ounces, weighs 44 grams and has a wall thickness of 40 mils. The oriented bottle was blown from a 5½ inch long extrusion blow molded parison into a bottle 7 inches high having a wall thickness of 25 mils, weighing 26.8 grams, having a 2¼ inch diameter and an internal volume of 10.3 fluid ounces. The oriented bottle had an orientation release stress in the circumferential direction of 900 p.s.i. The two bottles exhibit completely different behavior patterns under the conditions of the creep strain test: 98° F., 50 per cent relative humidity and a 3000 p.s.i. wall stress. The oriented bottle has a total strain in the circumferential direction of 1.6 per cent after 1000 hours. By contrast, the unoriented bottle shows a creep strain of 9 per cent after only 20 hours at the same conditions.

Other tests indicate that resistance to creep strain improves as the amount of molecular orientation is increased. Unoriented bottles were made by conventional extrusion blow molding while the oriented bottles were made by blowing at low temperatures, between 190° and 218° F. The following results indicate the per cent creep strain at 3300 p.s.i. at 100 hours at 98° F., at 50 per cent relative humidity in the circumferential direction:

TABLE IV

| CIRCUMFERENTIAL ORIENTATION RELEASE STRESS (p.s.i.) | STRAIN (%) |
|---|---|
| 0 | 6.2 (30 hours) |
| 540 | 3.6 |
| 640 | 2.0 |
| 850 | 1.7 |

As seen above, unoriented bottles creep more in 30 hours than do any of the oriented bottles at 100 hours.

Figure 4:
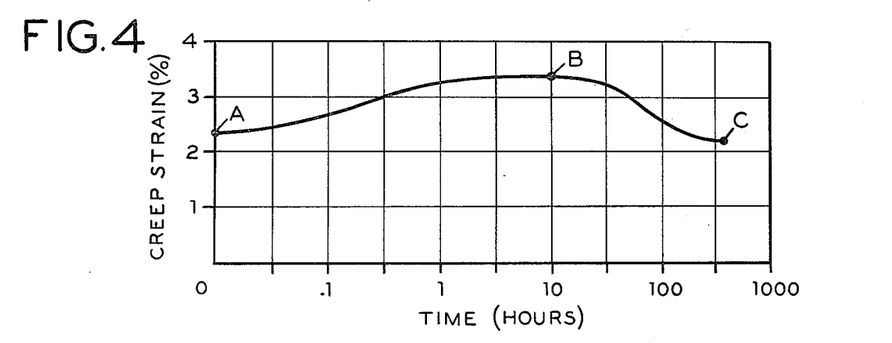
FIG. 4 is a graph showing three kinds of strain in an oriented bottle.

The graph shown in FIG 4 illustrates how zero or negative creep strain can be attained. The bottle was blown from an extrusion blow molded parison 5½ inches long. The parison had a three-fourths inch outer diameter with a 0.130 inch thick wall.

The parison was heated in a 550° F. radiant over for 49 seconds and cooled for 85 seconds prior to blowing. The bottle was blown at a maximum pressure of 500 p.s.i. with a 43 second blowing time. The bottle developed an orientation release stress of 800 p.s.i. in the circumferential direction. The bottle was tested for creep strain in the circumferential direction at 98° F. at 50 per cent relative humidity at a wall stress of 2000 p.s.i.

Elastic strain is the strain which occurs immediately on stressing the bottle. Because it is impossible to make accurate measurements of strain at extremely short periods of time, the elastic strain is defined as "the strain which occurs in the first 36 seconds of the test". This is the strain at Point A on the graph of FIG. 4. The strain at longer time periods represents a balance between viscous extension and "orientation contraction". During the time represented by the interval A-B viscous extension dominated and the specimen extended. During the time period B-C "orientation contraction" was the dominant effect and the sample contracted. If the specimen had been more highly oriented there would have been even more orientation contraction and the net strain could have been zero or even a negative percentage.

The following tables (V and VI) described bottles blown from extrusion blow molded parisons 5, 5½ and 6 inches long, having a three-fourths inch outer diameter and a 0.130 inch thick wall. The closed end of the parisons were formed in the extrusion blow molding step. The parisons were heated in a radiant oven having a temperature of 550°F. After removal from the oven the parisons were conditioned for blowing by holding them in the air.

TABLE V

| Parison length (inches) | | 5" | 5 ½" | 6" |
|---|---|---|---|---|
| Time in oven (seconds) | | 50–51 | 50 | 50 |
| Thermal conditioning (seconds) | | 68 | 68–78 | 65–75 |
| Max. blowing pressure (p.s.i.) | | 120 | 120 | 120 |
| Blowing time (seconds) | | 27–32 | 27–30 | 20–35 |
| Bottle height (inches) | | 7 | 7 | 7 |
| Bottle wall thickness (inches) | | .023 | .025 | .027 |
| Bottle weight (grams) | | 24.4 | 26.8 | 29.3 |
| Bottle diameter (inches) | | 2 ¼ | 2 ¼ | 2 ¼ |
| Bottle internal volume (fl. oz.) | | 10.3 | 10.3 | 10.3 |
| Orientation release stress, circumferential direction (p.s.i.) | | 790 | 900 | 950 |
| % creep strain at 100 hours., 50% R. H. 98°F. Wall stress (p.s.i.): | 3000 | .80 | 1.2 | 1.05 |
| | 4000 | — | 2.0–2.1 | 2.6 |
| | 5000 | 2.9 | 3.3 | 3.6 |
| % creep strain at 1000 hrs. 50% R. H. 98°F. Wall stress (p.s.i.): | 3000 | 1.04 | 1.6 | 1.30 |
| | 4000 | — | 2.6–2.8 | 4.1 |
| | 5000 | 4.0 | 4.6 | 4.7 |

Additional bottles were filled with carbonated water (3.7 ml. $CO_2$/ml. $H_2O$). These bottles were sealed and tested for impact resistance by dropping them on their bottoms onto a steel surface at 73° F. (Table VI).

In Table VI, B means the bottle broke, and P (passed) means the bottle remained whole, and a dash means not tested. The failure of sample 4, 5½ inch length, appears to be anomalous in view of the remainder of Table II and other tests.

TABLE VI

| PARISON LENGTH | | DROP HEIGHT | | | |
|---|---|---|---|---|---|
| | | 5' | 10' | 15' | 20' |
| 5" | No. 1 | P | P | P | B |
| | No. 2 | P | P | P | P |
| 5 ½" | No. 1 | P | P | P | B |
| | No. 2 | P | P | — | — |
| | No. 3 | — | P | P | B |
| | No. 4 | B | — | — | — |
| | No. 5 | — | — | P | — |
| 6" | No. 1 | P | P | P | P |
| | No. 2 | — | B | — | — |
| | No. 3 | P | P | B | — |

In yet another test, an injection molded parison was blow molded to develop an orientation release stress in the circumferential direction of 1520 p.s.i. This bottle had a transparent appearance, as did all other bottles discussed above.

Other specific polymers which are considered to be particularly advantageous for use in the instant invention are given below:

TABLE VII

| COMPONENT (proportions by wt.) | A | B | C | D | E | F |
|---|---|---|---|---|---|---|
| acrylonitrile (parts) | 70 | 70 | 70 | 70 | 70 | — |
| methacrylonitrile (parts) | — | — | — | — | — | 75 |
| ethyl acrylate (parts) | 30 | 30 | 30 | 30 | — | — |
| methyl acrylate (parts) | — | — | — | — | 30 | — |
| methyl methacrylate (parts) | — | — | — | — | — | 25 |
| nitrile rubber (parts) | 10 | 15 | 10.7 | 10 | 9 | 10 |
| 1,3-butadiene (%) | 60 | 60 | 60 | 75 | 75 | 70 |
| acrylonitrile (%) | 40 | 40 | 40 | 25 | 25 | 30 |

A parison comprising 88 parts by weight methacrylonitrile and 12 parts by weight styrene was fabricated by injection molding. The parison was heated by placing it on a heated core pin, 265° F., and inserting the pin in an air oven, 250°F., for 4½ minutes. The parison was blown at a maximum pressure of 70 p.s.i. in about 20 seconds. The blown bottle developed an orientation release stress of 540 p.s.i. in the circumferential direction.

It is believed that acrolein also functions in the acrylonitrile copolymers. It is also believed that acrolein and alpha-methyl styrene function with methacrylonitrile copolymers. Terpolymers that are believed to function reasonably well include: acrylonitrile, methacrylonitrile and styrene; and acrylonitrile, methacrylonitrile and alpha-methyl styrene.

The instant invention applies to jars as well as bottles. It is also envisioned that the present invention could be made to function with other polymers such as acrylic multipolymers, copolymers of methacrylonitrile and polystyrene, saran and polyvinylchloride.

It is thought that the invention and many of its attendant advantages will be understood from the foregoing description and it will be apparent that various changes may be made in the form, construction and arrangement of the parts of the article and that changes may be made in the steps of the method described and their order of accomplishment without departing from the spirit and scope of the invention or sacrificing all of its material advantages, the form hereinbefore described being merely a preferred embodiment thereof.

We claim:

1. A container for holding a pressurized product, said container having a substantially transparent sidewall formed of a molecularly oriented polymeric material comprising a polymer containing moieties derived from a conjugated diene monomer and a polymer containing moieties derived from an alpha, beta-olefinically unsaturated mononitrile having the formula where R is selected from the group consisting of hydrogen, an alkyl group having from 1 to 4 carbon atoms, and a halogen, said sidewall having an average circumferential orientation release stress between about 500 and about 2500 p.s.i. as measured for total sidewall thickness.

2. The container of claim 1 wherein the conjugated diene monomer is selected from the group consisting of butadiene and isoprene.

3. The container of claim 1 wherein the said polymeric material is a composition containing 100 parts by weight of the nitrile-containing polymer and from about 1 to about 20 additional parts by weight of said polymer containing moieties derived from a conjugated diene monomer.

4. The container of claim 3 wherein said nitrile-containing polymer is a polymer containing a major proportion of moieties derived from said mononitrile.

5. The container of claim 4 wherein said moieties derived from conjugated diene monomer comprise a major proportion of the polymer containing said moieties.

6. The container of claim 4 wherein the said orientation release stress is between about 500 and about 1600 p.s.i. and wherein the amount of the said polymer containing moieties derived from a conjugated diene monomer is from about 10 to about 20 parts by weight.

7. The container of claim 5 wherein the said orientation release stress is between about 500 and 1600 p.s.i., and wherein the amount of the said polymer containing moieties derived from a conjugated diene monomer is from about 10 to about 20 parts by weight.

8. The container of claim 3 wherein the amount of the said polymer containing moieties derived from a conjugated diene monomer is from about 8 to about 20 parts by weight.

9. The container of claim 4 wherein the amount of said polymer containing moieties derived from a conjugated diene monomer is from about 8 to about 20 parts by weight.

10. The container of claim 5 wherein the amount of the said polymer containing moieties derived from a conjugated diene monomer is from about 8 to about 20 parts by weight.

11. The container of claim 4 wherein said sidewall has a creep strain in the circumferential direction of less than 3% under a wall stress of 3000 p.s.i. in the circumferential direction at 100 hours at 98° F at 50% relative humidity.

12. The container of claim 11 wherein the amount of the said polymer containing moieties derived from a conjugated diene monomer is from about 8 to about 20 parts by weight.

13. The container of claim 4 wherein the nitrile is selected from the group consisting of acrylonitrile and methacrylonitrile.

14. The container of claim 13 wherein the amount of the said polymer containing moieties derived from a conjugated diene monomer is from about 8 to about 20 parts by weight.

15. The container of claim 5 wherein the nitrile is selected from the group consisting of acrylonitrile and methacrylonitrile.

16. The container of claim 1 wherein the said polymeric material is a composition resulting from the polymerization of a major portion of said olefinically unsaturated nitrile and a minor portion of an ester of an olefinically unsaturated nitrile and a minor portion of an ester of an olefinically unsaturated carboxylic acid in the presence of a copolymer having a major proportion of moieties derived from conjugated diene monomer and a minor proportion of moieties derived from olefinically unsaturated nitrile.

17. The container of claim 1 wherein the said polymeric material is a composition resulting from the polymerization of 100 parts by weight of
A. a major portion of said olefinically unsaturated nitrile and
B. a minor portion of an ester of an olefinically unsaturated carboxylic acid in the presence of from about 1 to about 20 additional parts by weight of
C. a copolymer having a major proportion of moieties derived from conjugated diene monomer and a minor proportion of moieties derived from olefinically unsaturated nitrile.

18. The container of claim 17 wherein the conjugated diene monomer is selected from the group consisting of butadiene and isoprene.

19. The container of claim 18 wherein there is employed at least 60% by weight of (A), based on the combined weight of (A) and (B).

20. The container of claim 19 wherein the (B) component is an ester of an alpha, beta-olefinically unsaturated carboxylic acid having the formula where $R_1$ is selected from the group consisting of hydrogen, an alkyl group having from 1 to 4 carbon atoms and a halogen, and $R_2$ is an alkyl group having from 1 to 6 carbon atoms and wherein there is employed up to 40% by weight of (B), based on the combined weight of (A) and (B).

21. The container of claim 1 wherein said sidewall has a creep strain in the circumferential direction of less than 3% under a wall stress of 3000 p.s.i. in the circumferential direction at 100 hours at 98° F at 50% relative humidity.

22. The container of claim 2 wherein said sidewall has a creep strain in the circumferential direction of less than 3% under a wall stress of 3000 p.s.i. in the circumferential direction at 100 hours at 98° F at 50% relative humidity.

23. The container of claim 17 wherein said sidewall has a creep strain in the circumferential direction of less than 3% under a wall stress of 3000 p.s.i. in the circumferential direction at 100 hours at 98° F at 50% relative humidity.

24. The container of claim 20 wherein said sidewall has a creep strain in the circumferential direction of less than 3% under a wall stress of 3000 p.s.i. in the circumferential direction at 100 hours at 98° F at 50% relative humidity.

25. The container of claim 1 wherein the nitrile is selected from the group consisting of acrylonitrile and methacrylonitrile.

26. The container of claim 2 wherein the nitrile is selected from the group consisting of acrylonitrile and methacrylonitrile.

27. The container of claim 20 wherein the nitrile is selected from the group consisting of acrylonitrile and methacrylonitrile.

28. The container of claim 17 wherein the ester is selected from the group consisting of methyl acrylate, ethyl acrylate and methyl methacrylate.

29. The container of claim 27 wherein the ester is selected from the group consisting of methyl acrylate, ethyl acrylate and methyl methacrylate.

30. The container of claim 4 wherein the said nitrile-containing polymer is a copolymer resulting from the polymerization of a major portion of said mononitrile and a minor portion of an ester selected from the group consisting of methyl acrylate, ethyl acrylate and methyl methacrylate.

31. The container of claim 1 wherein the said polymeric material is derived from 73 to 77 parts by weight acrylonitrile and 27 to 23 parts by weight methyl acrylate, polymerized in the presence of 8 to 10 additional parts by weight of a nitrile rubber containing about 70 percent by weight butadiene moieties and about 30 percent by weight acrylonitrile moieties.

32. The container of claim 21 wherein the said polymeric material is derived from 73 to 77 parts by weight acrylonitrile and 27 to 23 parts by weight methyl acrylate, polymerized in the presence of 8 to 10 additional parts by weight of a nitrile rubber containing about 70 percent by weight butadiene moieties and about 30 percent by weight acrylonitrile moieties.

33. The container of claim 3 wherein the nitrile is selected from the group consisting of acrylonitrile and methacrylonitrile, the container has a weight of from 0.03 to 0.13 gram per cubic centimeter of internal volume, and said sidewall has a creep strain in the circumferential direction of less than 3 percent under a wall stress of 3000 p.s.i. in the circumferential direction at 100 hours at 98° F at 50 percent relative humidity.

34. The container of claim 1 weighing 0.03 to 0.13 gram per cubic centimeter of internal volume blown from a thermoplastic polymer having an oxygen permeability between 0.3 and 6.0 cubic centimeters per 100 square inches per mil thickness and a carbon dioxide permeability between 0.5 and 10.0 cubic centimeters per 100 square inches per mil thickness, each permeability being measured at a differential pressure of 1 atmosphere at 73° F and zero percent relative humidity per 24 hours, said bottle having a sidewall creep strain in the circumferential direction of less than 3 percent under a wall stress of 3000 p.s.i. in the circumferential direction at 100 hours at 98° F at 50 percent relative humidity and able to withstand a free fall of at least 3 feet onto a steel surface when dropped on its bottom when enclosed and filled with water carbonated with 3.7 volumes of carbon dioxide per 1 volume of water.

35. The container of claim 1 weighing 0.03 to 0.13 gram per cubic centimeter of internal volume blown from a polymer derived from about 60 to 90 parts by weight of acrylonitrile or methacrylonitrile and about 40 to 10 parts by weight respectively of an ester selected from the group consisting of methyl acrylate, ethyl acrylate and methyl methacrylate, polymerized in the presence of about 1 to 20 parts by weight of a nitrile rubber containing about 60 to 80 percent by weight butatdiene or isoprene moieties and about 40 to 20 percent by weight acrylonitrile or methacrylonitrile moieties, said bottle having a sidewall creep strain in the circumferentail direction of 0.25 to 3.0 percent under a wall stress of 4000 p.s.i. in the circumferential direction at 100 hours at 98° F at 50 percent relative humidity and able to withstand a free fall on a steel surface when dropped on its bottom between 8 and 20 feet when enclosed and filled with water carbonated with 3.7 volumes of carbon dioxide per 1 volume of water.

36. The container of claim 1 wherein the said polymeric material is a composition resulting from the polymerization of a major proportion of said olefinically unsaturated mononitrile and a minor proportion of an aromatic olefin in the presence of said polymer containing moieties derived from a conjugated diene monomer.

37. The container of claim 36 wherein the said polymer comprises a major proportion of said moieties derived from a conjugated diene monomer and a minor proportion of an aromatic olefin.

38. The container of claim 37 wherein both of said minor proportions of an aromatic olefin are the same olefin.

39. The container of claim 1 wherein the said polymeric material is a composition resulting from the polymerization of 100 parts by weight of
A. a major portion of said olefinically unsaturated mononitrile and
B. a minor portion of an aromatic olefin in the presence of from about 1 to about 20 additional parts by weight of
C. a polymer having a major proportion of moieties derived from conjugated diene monomer and a minor proportion of moieties derived from an aromatic olefin.

40. The container of claim 39 wherein the conjugated diene monomer is selected from the group consisting of butadiene and isoprene.

41. The container of claim 40 wherein there is employed at least 60% by weight of (A), based on the combined weight of (A) and (B).

42. The container of claim 39 wherein the aromatic olefin contains 8–14 carbon atoms.

43. The container of claim 39 wherein the aromatic olefin is selected from the group consisting of styrene, alpha-methyl styrene, and vinyl toluene.

44. The container of claim 39 wherein the amount of (C) is up to 11 parts by weight.

45. The container of claim 39 wherein the amount of (C) is about 3 parts by weight.

46. The container of claim 39 wherein the amount of (C) is about 6 parts by weight.

47. The container of claim 39 wherein the amount of (C) is about 11 parts by weight.

48. A container for holding a pressurized product, said container having a substantially transparent sidewall formed of a molecularly oriented polymeric material comprising
a polymer containing a major proportion of moieties derived from a conjugated diene and a minor proportion of a polymerizable aromatic olefin, and
a polymer containing a major proportion of moieties derived from an alpha, beta-olefinically unsaturated mononitrile having the formula where R is selected from the group consisting of hydrogen, an alkyl group having from 1 to 4 carbon atoms, and a halogen, and a minor proportion of said aromatic olefin, said sidewall having an average circumferential orientation release stress between about 500 and about 2500 p.s.i. as measured for total sidewall thickness.

49. The container of claim 48 wherein said aromatic olefin is styrene.

50. The container of claim 4 wherein the said nitrile-containing polymer is a copolymer resulting from the polymerization of a major portion of said mononitrile and a minor portion of an aromatic olefin.

* * * * *

UNITED STATES PATENT AND TRADEMARK OFFICE
CERTIFICATE OF CORRECTION

PATENT NO. : 3,984,498
DATED : October 5, 1976
INVENTOR(S) : Charles Edmund McChesney, et al It is certified that error appears in the above-identified patent and that said Letters Patent are hereby corrected as shown below:

Cover page, 2nd column, 3rd line, "3,733,797" should be --3,737,497--.

Col. 1, line 24, "road" should be --load--.

Col. 4, line 28, "lest" should be --least--.

Col. 8, line 35, "over" should be --oven--.

Col. 8, line 37, "500" should be --150--.

Col. 12, lines 9 and 10, claim 16, "olefinically unsaturated nitrile and a minor portion of an ester of an" should be deleted.

Col. 15, line 1, claim 48, "$CH=\underset{R}{C}-CN$" should be --$CH_2=\underset{R}{C}-CN$--.

Signed and Sealed this
Eighth Day of March 1977

[SEAL]

Attest:

RUTH C. MASON
*Attesting Officer*

C. MARSHALL DANN
*Commissioner of Patents and Trademarks*